(12) United States Patent
Easterling et al.

(10) Patent No.: US 10,070,153 B2
(45) Date of Patent: Sep. 4, 2018

(54) AIRCRAFT COMMUNICATIONS SYSTEM STORING VIDEO CONTENT WHILE ON THE GROUND AND ASSOCIATED METHODS

(71) Applicant: Thales, Inc., Melbourne, FL (US)

(72) Inventors: Scott D. Easterling, Malabar, FL (US); R. Michael Keen, Malabar, FL (US); Jason Funderburk, Melbourne, FL (US)

(73) Assignee: THALES, INC., Melbourne, FL (US)

( * ) Notice: Subject to any disclaimer, the term of this patent is extended or adjusted under 35 U.S.C. 154(b) by 0 days.

(21) Appl. No.: 14/670,807

(22) Filed: Mar. 27, 2015

(65) Prior Publication Data

US 2016/0286243 A1  Sep. 29, 2016

(51) Int. Cl.
| H04N 7/18 | (2006.01) |
| H04N 21/214 | (2011.01) |
| H04N 21/61 | (2011.01) |
| H04N 21/466 | (2011.01) |
| H04N 21/643 | (2011.01) |
| H04N 21/436 | (2011.01) |
| H04N 21/4363 | (2011.01) |
| H04N 21/462 | (2011.01) |
| H04N 21/647 | (2011.01) |

(52) U.S. Cl.
CPC ... *H04N 21/2146* (2013.01); *H04N 21/43615* (2013.01); *H04N 21/43637* (2013.01); *H04N 21/4621* (2013.01); *H04N 21/4668* (2013.01); *H04N 21/6193* (2013.01); *H04N 21/643* (2013.01); *H04N 21/64707* (2013.01)

(58) Field of Classification Search
CPC .......... H04N 21/2146; H04N 21/4668; H04N 21/643; H04N 21/6193
USPC ................. 725/44, 76, 81, 87, 100
See application file for complete search history.

(56) References Cited

U.S. PATENT DOCUMENTS

| 7,974,293 B2 | 7/2011 | Lee | |
| 8,068,829 B2 | 11/2011 | Lemond et al. | |
| 2002/0035727 A1* | 3/2002 | Numata | H04N 5/44543 725/44 |
| 2006/0107295 A1* | 5/2006 | Margis | H04N 7/163 725/81 |
| 2007/0050834 A1* | 3/2007 | Royo | H04N 7/17336 725/119 |
| 2008/0240062 A1* | 10/2008 | Lynch | H04B 7/18508 370/338 |
| 2009/0096857 A1* | 4/2009 | Frisco | H04B 7/18508 348/14.02 |
| 2012/0030717 A1 | 2/2012 | Buga et al. | |
| 2013/0111522 A1 | 5/2013 | Tatem et al. | |

(Continued)

*Primary Examiner* — Nnenna Ekpo
(74) *Attorney, Agent, or Firm* — Sage Patent Group (57) ABSTRACT

An aircraft communications system includes a satellite video receiver, a ground video receiver, wireless local area network (WLAN) circuitry to provide a WLAN within the aircraft, a processor and memory coupled to the processor. The processor is configured to supply video content from the satellite video receiver to the PEDs via the WLAN circuitry, store video content from the ground video receiver in the memory based upon a popularity rating of the video content, and supply stored video content to personal electronic devices (PEDs) within the aircraft via the WLAN.

24 Claims, 10 Drawing Sheets

(56) References Cited

U.S. PATENT DOCUMENTS

| | | | |
|---|---|---|---|
| 2013/0276036 A1* | 10/2013 | Tranchina | H04N 21/654 |
| | | | 725/75 |
| 2014/0011441 A1 | 1/2014 | Lauer | |
| 2014/0062765 A1* | 3/2014 | Brenner | G01S 19/07 |
| | | | 342/357.3 |
| 2014/0074321 A1* | 3/2014 | Lee | H04B 3/542 |
| | | | 701/3 |
| 2014/0137170 A1* | 5/2014 | Molinelli | H04N 21/26258 |
| | | | 725/93 |
| 2015/0113554 A1* | 4/2015 | Stern | H04N 21/252 |
| | | | 725/32 |

* cited by examiner

AIRCRAFT COMMUNICATIONS SYSTEM STORING VIDEO CONTENT WHILE ON THE GROUND AND ASSOCIATED METHODS

BACKGROUND OF THE INVENTION

The present invention relates to the field of aircraft systems, and more particularly, to an aircraft communications system storing video content from a ground video receiver and related methods.

BACKGROUND

Aircraft often provide entertainment systems to satisfy passenger demand for entertainment during travel. Conventional passenger entertainment systems include overhead cabin viewing systems and/or seatback viewing systems with individual controls for selecting the viewing content.

Coaxial cables are used in conventional passenger entertainment systems to distribute the viewing content to the overhead cabin viewing systems and the seatback viewing systems. In lieu of coaxial cables, the viewing content may be wirelessly provided from access points within the aircraft to seatback displays and to personal electronic devices (PEDs) carried by the passengers.

U.S. published patent application no. 2006/0107295 to Margis et al. discloses PEDs and seatback displays interfacing with access points within the aircraft, and wirelessly receiving entertainment related information from different media content sources. One of the media content sources is a satellite communications system that provides streaming video content in an MPEG-4 FGS (Fine Granularity Scalable) format. A transceiver system within the aircraft provides the streaming video to the PEDs or seatback displays via a content distribution system.

Another approach for wirelessly distributing entertainment related information within an aircraft is disclosed in U.S. Pat. No. 7,974,293 to Lee. In Lee, a server includes network interface cards that wirelessly communicate with various user terminals, which may be PEDs and seatback displays. Each server includes a transcoding module to change the format of the signals. The signals may be provided in real time, i.e., from live broadcasts, or they may be pre-recorded. Transcoding may be performed so that content may be distributed in the desired form. A request for a particular coding format or scheme may be requested at the user terminal. The transcoding may be performed for all of the signals received or may be performed on an individual basis when a particular piece of content is purchased.

The cabin area is a non-uniform environment for wireless transmissions. Seamless viewing of the entertainment related information may be disrupted by transmission errors. Transmission errors may occur due to RF reflections within the cabin. RF reflections may be attributed to the general layout of the cabin, people moving around in the cabin, and even the service cart being pushed up and down the aisle. There is a need to wirelessly provide entertainment related information while overcoming the non-uniform communication conditions within the aircraft.

SUMMARY

A communications system for an aircraft carrying personal electronic devices (PEDs) for wireless data communications is provided. The communications system may comprise a satellite video receiver, a ground video receiver, wireless local area network (WLAN) circuitry configured to provide a WLAN within the aircraft, and a processor and memory coupled thereto. The processor may be configured to supply video content from the satellite receiver to the PEDs via the WLAN circuitry, store video content from the ground video receiver in the memory based upon a popularity rating of the video content, and supply stored video content to the PEDs via the WLAN.

The processor and memory may be located within an aircraft server unit (ASU). The ASU is advantageously updated via the ground video receiver while on the ground based upon a popularity rating of the entertainment related information being recorded.

The popularity rating of the video content may be based on statistics. Popular movies/shows as determined by Nielson data, for example, may be stored in their entirety on the ASU. In addition, other rating service data or even social media may be used to determine which movies/shows are to be stored in their entirety on the ASU.

Alternatively, the popularity rating of the video content may be user determined. The popularity rating of the video content may be based upon a time of day. The popularity rating of the video content may also be based upon a broadcast channel.

The processor may be configured to catalog the video content, and place the cataloged video content within an on-demand menu available for selection by a PED.

The video content may comprise a plurality of television shows stored over a plurality of consecutive days, with each day having at least one television show associated therewith. The processor may be configured to divide the on-demand menu into a plurality of sub-menus, with each sub-menu representing one of the consecutive days and the television shows associated therewith. The processor may be configured to remove the at least one television show from the memory for each consecutive day after a predetermined number of consecutive days have occurred since being stored in the memory.

The satellite video receiver may be configured to receive live video signals. The stored video content may be supplied to the PEDs as streaming video.

The WLAN circuitry may comprise at least one access point. The WLAN may comprise at least one of an 802.11 WLAN and an 802.16 WLAN.

Another aspect is directed to a method for operating a communications system as described above. The method may comprise operating the processor to supply video content from the satellite receiver to the PEDs via the WLAN circuitry, store video content from the ground video receiver in the memory based upon a popularity rating of the video content, and supply stored video content to the PEDs via the WLAN.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Like numbers refer to like elements throughout, and prime notation is used to indicate similar elements in alternate embodiments.

Figure 1:
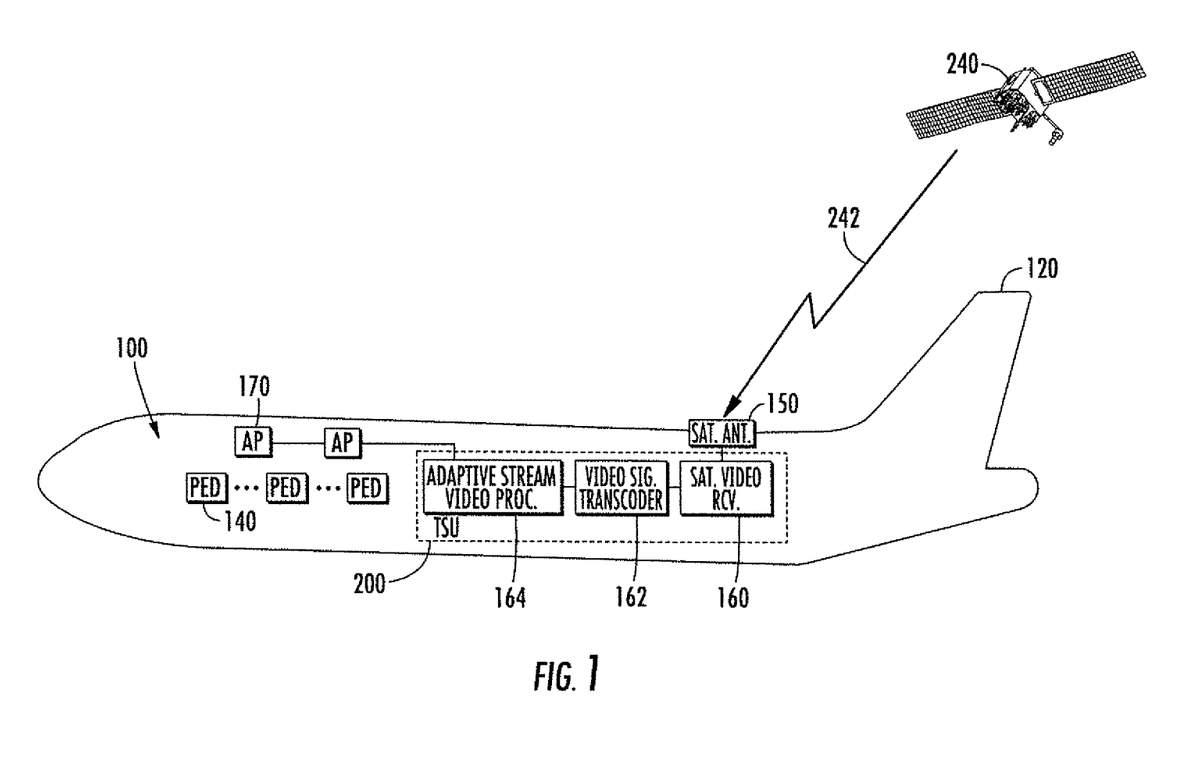
FIG. 1 is a block diagram of an aircraft communications system with an adaptive streaming video processor in accordance with the present invention.

Referring initially to FIG. 1, a communications system 100 for an aircraft 120 in which adaptive streaming video is provided to personal electronic devices (PEDs) 140 within the aircraft will be discussed. The communications system 100 includes a satellite video receiver 160, a video signal transcoder 162 coupled to the satellite video receiver, and an adaptive streaming video processor 164 coupled to the video signal transcoder.

The satellite video receiver 160 is coupled to a satellite antenna 150 which receives live video signals from a satellite 240 over a satellite interface 242. The satellite 240 may be a DirectTV™ satellite, for example. The video signal transcoder 162 converts the live video signals from one format to another.

The adaptive streaming video processor 164 is configured to create a plurality of video data files at different data rates, and divide each of the plurality of video data files into shorter chunks of video data along with associated index files. At least one access point 170 is coupled to the adaptive streaming video processor 164 for providing wireless local area network (WLAN) within the aircraft 120 to distribute the shorter chunks of video data and associated index files to PEDs 140 within the aircraft as requested by the PEDs based on communication conditions within the aircraft. Depending on the size of the aircraft 120, there is generally several access points 170 spread throughout the cabin.

In one embodiment, the adaptive streaming video processor 164 is configured for HTTP Live Streaming (HLS). At a high level, HLS creates multiple video data files for distribution to the PEDs 140, which can adaptively change streams to optimize the playback experience. As an HTTP-based technology, no streaming server is required, so the switching logic resides on the PEDs 140. HLS uses multiple encoded files with index files directing the PEDs 140 to different streams and chunks of video data within those streams. The PEDs 140 monitor changing bandwidth conditions.

To distribute the video data files to the PEDs 140, the adaptive streaming video processor 164 encodes the source into multiple files at different data rates and divides them into short chunks, usually between 5-10 seconds long. The video data files are associated with a manifest file having an extension that directs the PEDs 140 to additional manifest files for each of the encoded streams. The PEDs 140 monitor changing bandwidth conditions. If changing bandwidth conditions dictate a stream change, the PEDs 140 check the original manifest file for the location of additional streams, and then the stream-specific manifest file for the URL of the next chunk of video data. Stream switching is generally seamless to the viewer.

The adaptive streaming video processor 164 may be configured to add digital rights management (DRM) encryption to the video data files. Although HLS does not inherently support digital rights management (DRM), protection may be provided by encrypting the data and providing key access using HTTPS authentication.

The PEDs 140 may be mobile or stationary devices. For example, the PEDs 140 may be devices presented to the passengers as they board the aircraft 120, devices carried on-board by the passengers, and devices integrated into the passenger seatbacks. The PEDs 140 include tablets, personal mobile smart phones, personal digital assistants, or laptop computers having Wi-Fi/WiMax capability, for example.

Transmission errors at the PEDs 140 may typically occur due to RF reflections within the cabin. RF reflections may be attributed to the general layout of the cabin, people moving around in the cabin, the service cart being pushed up and down the aisle, and even how a passenger's hand holds the PED 140 causing the antenna within the PED to be blocked.

Distributing shorter chunks of video data at different data rates along with the associated index files advantageously overcomes the non-uniform communication conditions within the aircraft 120. Live video signals may be seamlessly provided to the PEDs 140 so as to optimize the playback experience. The PEDs 140 communicate with the adaptive streaming video processor 164 to adaptively select the appropriate data rate. For example, if a chunk of video data was received with a large amount of errors, the PED 140 may adaptively select a next lower rate chunk of video data. Similarly, if the chunk of video data was received with little or no errors, then the PED 140 may adaptively select a next higher rate chunk of video data.

Figure 2:
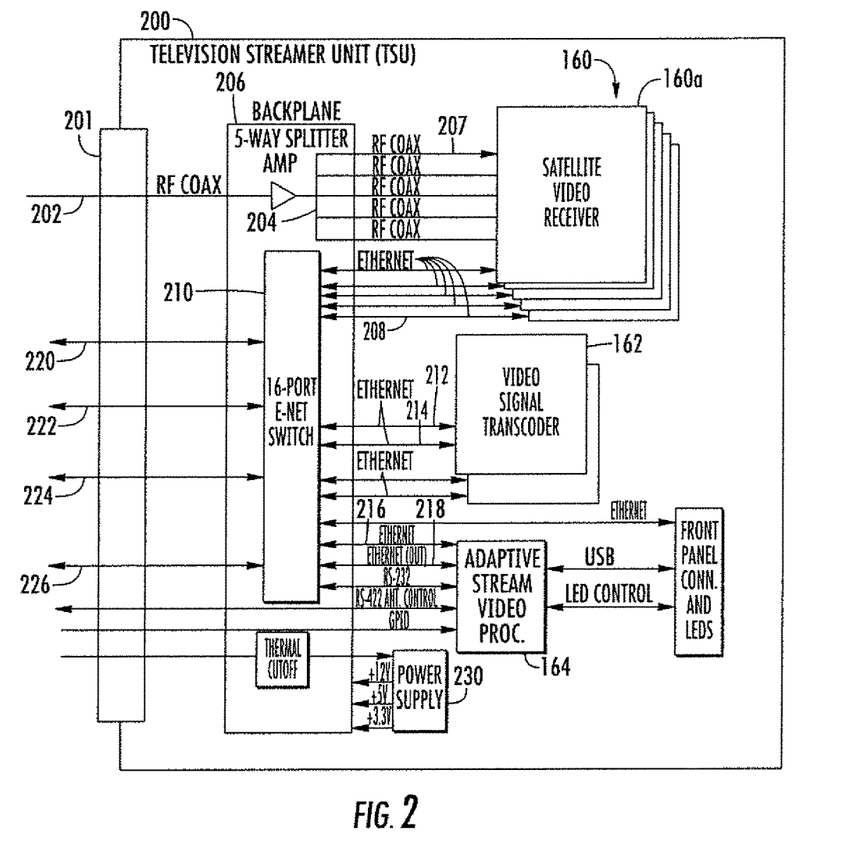
FIG. 2 is a block diagram of the satellite video receiver, video signal transcoder and adaptive streaming video processor illustrated in FIG. 1 configured within a television streamer unit (TSU).

The satellite video receiver 160, the video signal transcoder 162, and the adaptive streaming video processor 164 may be packaged as a line replaceable unit (LRU) referred to as a television streamer unit (TSU) 200. As illustrated in FIG. 2, inputs to the TSU 200 and outputs from the TSU pass through a connector 201. The TSU 200 also includes a power supply 230. A coaxial cable 202 from the satellite antenna 150 passes through the connector 201 to provide an intermediate frequency (IF) to the satellite video receiver 160.

The satellite video receiver 160 includes a number of receiver cards 160a. The receiver cards 160a may be DirectTV™ receiver cards, for example. Each receiver card 160a may process 8 television channels, for example. The final number of receiver cards 160a is based on the number of program streams to be provided. For example, one program stream may be provided to all of the passengers. In the illustrated embodiment, there are 5 receiver cards 160a.

The video signal transcoder 162 includes a number of video signal transcoder cards 162a. Each video signal transcoder card 162a may process 20 television channel streams, for example. The final number of video signal transcoder cards 162a may be based on the number of receiver cards 160a within the satellite video recorder 160. In the illustrated embodiment, there are 2 video signal transcoder cards 162a.

The IF from the coaxial cable 202 is passed through a 5-way splitter 204 at a backplane 206 within the TSU 200 so that each receiver card 160a receives the IF via its own coaxial cable 207. The number of receiver cards 160a determines the size of the splitter 204. An Ethernet output for each receiver card 160a provides Ethernet IP video to an Ethernet switch 210 via an Ethernet connection 208. The Ethernet IP video may be in an MPEG-2 format, for example. The Ethernet IP video is full resolution as provided by the satellite 240.

The Ethernet switch 210 includes tap points to direct the full resolution Ethernet IP video to a full resolution Ethernet output connection 220. The full resolution Ethernet IP video may be directed to a record and playback unit 250, as will be further discussed below. The tap points may reside on a single Ethernet interface, or multiple Ethernet interfaces, as readily appreciated by those skilled in the art. The Ethernet switch 210 allows the full resolution Ethernet IP video to be directed to the video signal transcoder 162 via an Ethernet connection 212.

Each video signal transcoder 162 reformats the Ethernet IP video for selectable resolution and data rates, and provides the reformatted Ethernet IP video back to the Ethernet switch 210 via an Ethernet connection 214. Instead of an MPEG-2 format, the reformatted Ethernet IF video may be in a different MPEG format, such as MPEG-4, for example. The reformatted Ethernet IP video may also be directed to the record and playback unit 250.

The reformatted Ethernet IP video from the video signal transcoder 162 may have a reduced resolution relative to the full resolution Ethernet IP video from the satellite video receiver 160. The Ethernet switch 210 includes additional tap points to direct the reformatted Ethernet IP video to a reformatted Ethernet output connection 222 through the connector 201. The Ethernet switch 210 allows the reformatted Ethernet IP video to be directed to the adaptive streaming video processor 164 via an Ethernet connection 216.

The adaptive streaming video processor 164 may be configured as a single board computer (SBC), and takes the reformatted Ethernet IP video and creates a plurality of video data files at different data rates, and divides each of the plurality of video data files into shorter chunks of video data along with associated index files. The video data files are provided to the Ethernet switch 210 via an Ethernet connection 218.

The Ethernet switch 210 directs the video data files at different data rates to a first adaptive Ethernet output connection 224. In addition, the Ethernet switch 210 includes additional tap points to direct the multi-rate video data files to a second adaptive Ethernet output connection 226 that is to be directed to the record and playback unit 250.

In other embodiments, the first adaptive Ethernet output connection 224 may be directed to the record and playback unit 250, and then from the record and playback unit to the access points 170. Consequently, the second adaptive Ethernet output connection 226 is optional in this embodiment.

Inputs and outputs of the TSU 200 pass through the connector 201. The connector 201 includes Ethernet ports for interfacing with the full resolution Ethernet output connection 220, the reformatted Ethernet output connection 222, and the first and second adaptive Ethernet output connections 224, 226. As noted above, tap points within the Ethernet switch 210 may be used to tap off the different Ethernet output connections.

Figure 3:
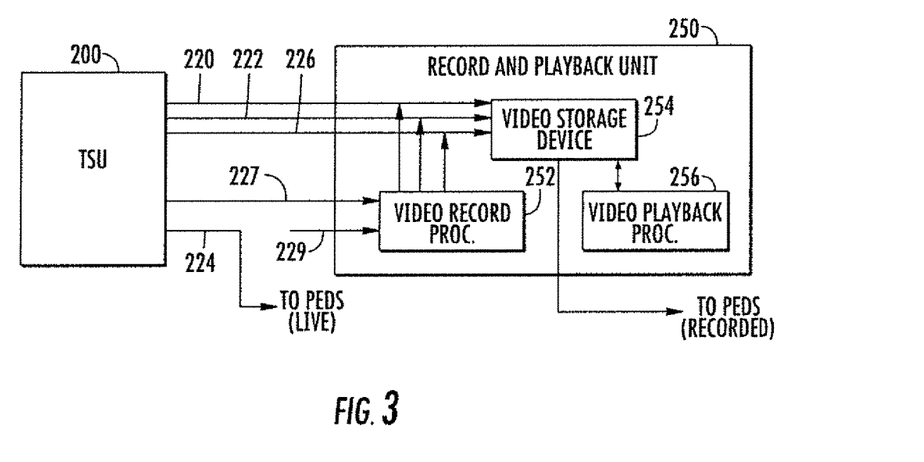
FIG. 3 is a block diagram of the TSU illustrated in FIG. 2 coupled to a record and playback unit.

Referring now to FIG. 3, operation of the record and playback unit 250 will now be discussed. The record and playback unit 250 allows live content off of the satellite 240 to be recorded and offered to the passengers for later viewing. Also, non-live content off of the satellite 240 may be recorded and offered to the passengers for later viewing. This advantageously allows passengers to record live content for later viewing, and pause and resume live content for convenience. This record and playback feature of the communications system 100 may be referred to, for example, as Primetime at Flight Time, Time Shifting, and Video on Demand.

The illustrated record and playback unit 250 is separate from the TSU 200, and includes a video record processor 252, a video storage device 254 and a video playback processor 256. Nonetheless, the data storage functionality may be within the TSU 200 in other embodiments. The video record processor 252 and the video storage device 254 receive and record data from the TSU 200.

The satellite video receiver 160, video signal transcoder 162, and adaptive streaming video processor 164 each has a respective video output. The full resolution Ethernet IP video from the video output of the satellite video receiver 160 is provided to the video storage device 254 via the full resolution Ethernet output connection 220. The reformatted Ethernet IP video from the video output of the video signal transcoder 162 is provided to the video storage device 254 via the reformatted Ethernet output connection 222. The multi-rate video data files from the video output of the adaptive streaming video processor 164 are provided to the video storage device 254 via the second adaptive video Ethernet output connection 226.

The video record processor 252 is coupled to the respective video outputs. In addition, the video record processor 252 receives metadata that describes the video in the Ethernet IP video provided to the video storage device 254. The metadata is received over interface connection 227, The metadata allows the video record processor 252 to decide what and when to record.

Other data may also be provided to the video record processor 252 for storage in the video storage device 254, such as cabin management systems (CMS) data and Internet data, for example. This other data also represents movies or other content as provided from sources other than the satellite. In addition, data recorded by the video storage device 254 may be provided from sources other than the TSU 200, such as from a data loader, a ground data link, or other means, as readily appreciated by those skilled in the art.

The video playback processor 256 is coupled to the video storage device 254 for playback control. The video playback processor 256 pulls the recorded IP video off of the video storage device 254 and provides it to the PEDs 140. In another embodiment, the video playback processor 256 provides the recorded IP video to the adaptive streaming video processor 164 which in turn provides it to the PEDs 140.

The recording/playback function of the record and playback unit 250 is not limited to any particular configuration. For example, the recording/playback function may be a dedicated LRU in the headend of the aircraft 120, part of the TSU 200, part of each passenger seatback, and even an application within a PED 140.

Currently, each PED 140 has a dedicated stream from the adaptive streaming video processor 164 for receiving the video data files. If there are 200 PEDs 140 receiving the video data files, for example, and each PED requires a 1 MB bandwidth, then a total bandwidth of 200 MB is required. However, there is a maximum bandwidth that can be supported.

To conserve bandwidth, the adaptive streaming video processor 164 may be configured to operate in a broadcast mode. Operating in a broadcast mode reduces the bandwidth requirements so that the freed up bandwidth can be available for other uses or applications.

Before operating in a broadcast mode, the PEDs 140 are surveyed by the TSU 200 to determine the individual bandwidth requirements of each PED. If the individual bandwidth requirements for the 200 PEDs 140 add up to 40 MB, for example, then a single 40 MB stream may be broadcast by the adaptive streaming video processor 164. Since a bandwidth of 160 MB is still available, this is 5 fold increase in bandwidth efficiency.

To survey the PEDs 140, statistics are collected by the TSU 200 from each PED. The PEDs 140 in effect operate in a closed loop environment that is actively monitored. The adaptive streaming video processor 164 can be switched back to a non-broadcast mode, i.e., individual streams for each PED 140.

Figure 4:
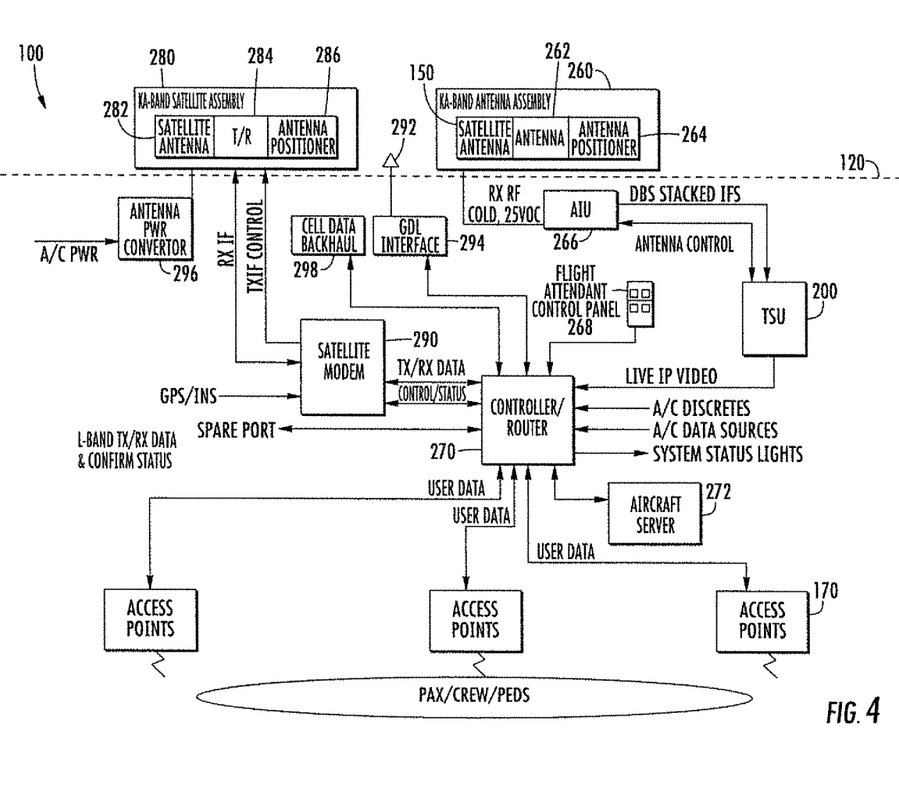
FIG. 4 is a more detailed block diagram of the communications system illustrated in FIG. 1.

A more detailed block diagram of the communications system 100 will now be discussed. The satellite antenna 150 is part of an antenna assembly 260. In the illustrated embodiment, the antenna assembly 260 is configured to operate in the Ku-band, for example, for receiving live satellite TV signals. The antenna assembly 260 includes a receiver 262 and an antenna positioner 264 for steering the satellite antenna toward the satellite 240. An antenna interface unit (AIU) 266 is positioned between the TSU 200 and the antenna assembly 260.

A flight attendant control panel 268 may be coupled to the controller/router 270. Live IP video from the TSU 200 is provided to a controller/router 270. The access points 170 are coupled to the controller/router 270. A server 272 is also coupled to the controller/router 270. In other embodiments, the controller/router 270 is not needed and the TSU 200 is connected directly to the access points 170.

The communications system 100 also includes a second antenna assembly 280. In the illustrated embodiment, the second antenna assembly 280 is configured to operate in the Ka-band, for example, for interfacing with a fixed satellite service (FSS) for providing Internet access to the PEDs 140.

The second antenna assembly 280 includes a satellite antenna 282, a receiver 284 and an antenna positioner 286 for steering the satellite antenna toward the FSS satellite. A satellite modem 290 interfaces between the second antenna assembly 280 and the controller/router 270. The communications system 100 also includes a ground data link system. The ground data link system includes an antenna 292 and a ground data link receiver and interface module 294. The ground data link receiver and interface module 294 is connected to the controller/router 270.

Power to the second antenna assembly 280 is provided by an antenna power converter 296. A cell data backhaul module 298 is also coupled to the controller/router 270.

Figure 5:
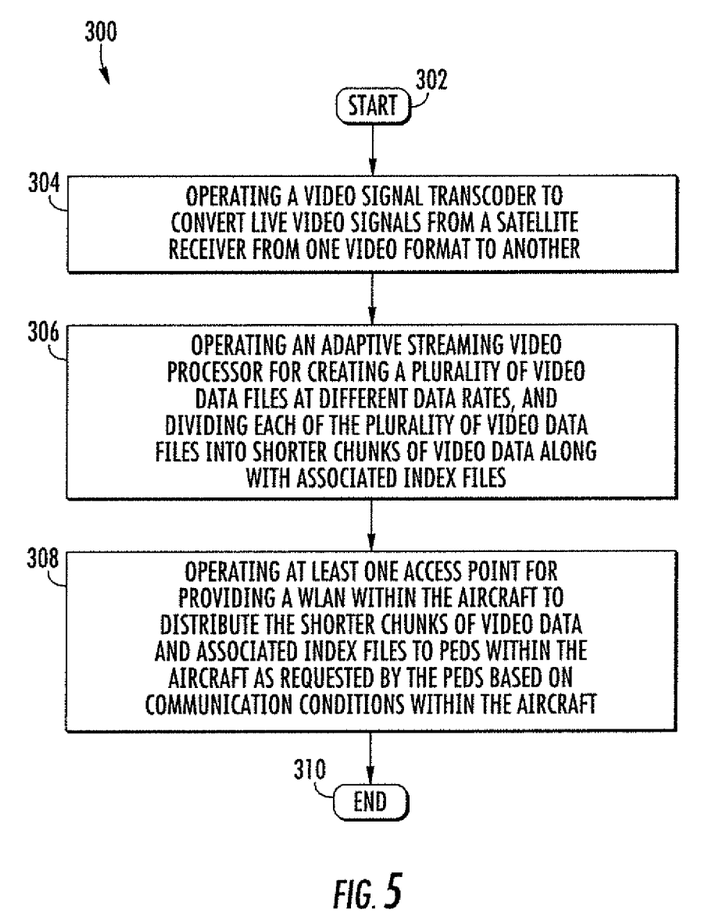
FIG. 5 is a flowchart for a method of operating the communications system illustrated in FIG. 1.

Referring now to the flowchart 300 illustrated in FIG. 5, a method for operating the communications system 100 as described above includes from the start (Block 302), operating the video signal transcoder 162 to convert live video signals from the satellite video receiver 160 from one video format to another at Block 304.

Figure 6:
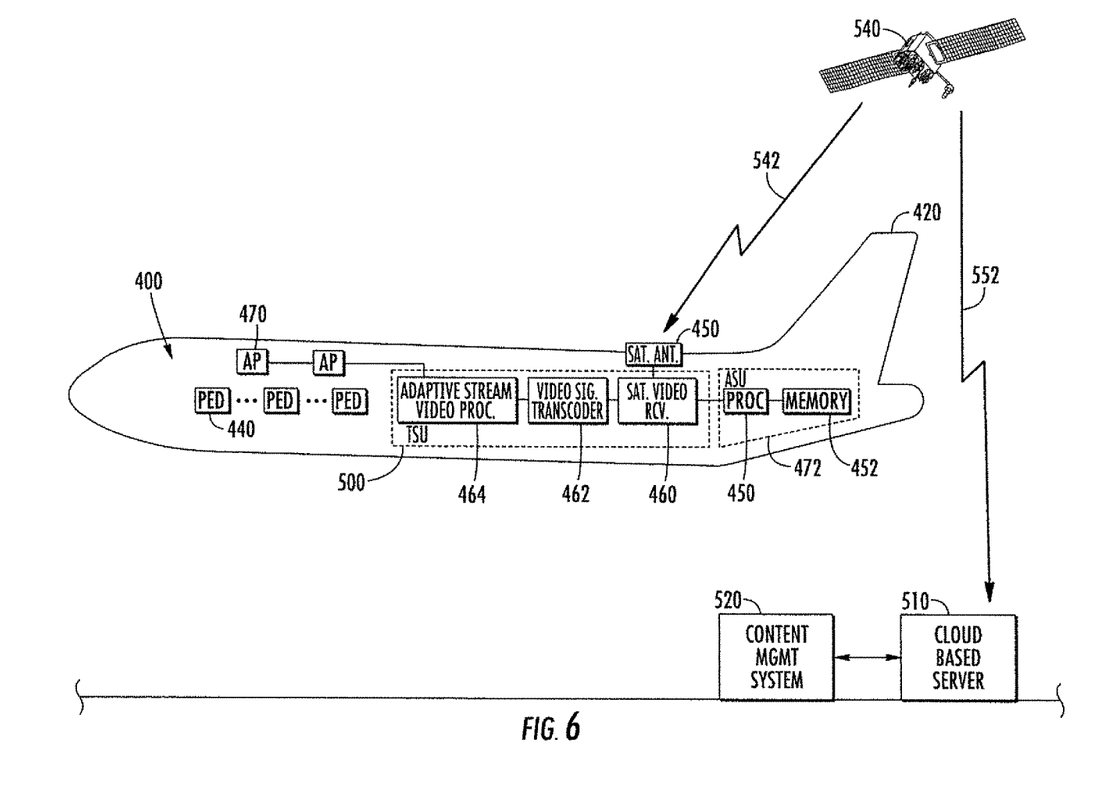
FIG. 6 is a block diagram of an aircraft communications system with a processor and a memory coupled thereto for storing video content from a satellite video receiver in accordance with the present invention.

The method further includes at Block 306 operating the adaptive streaming video processor 164 for creating a plurality of video data files at different data rates, and dividing each of the plurality of video data files into shorter chunks of video data along with associated index files. The at least one access point 170 is operated at Block 308 for providing a WLAN within the aircraft 120 to distribute the shorter chunks of video data and associated index files to PEDs 140 within the aircraft as requested by the PEDs based on communication conditions within the aircraft. The method ends at Block 310. Referring now to FIG. 6, another aspect is directed to updating entertainment related information stored on an aircraft 420, with the updated entertainment related information being provided from a satellite video receiver 460 that is coupled to a satellite antenna 450. The entertainment related information includes video content, such as movies and television shows, web pages, and media other than video.

A communications system 400 for the aircraft 420 carrying PEDs 440 for wireless data communications includes the satellite video receiver 460, wireless local area network (WLAN) circuitry (i.e., access points 470) configured to provide a WLAN within the aircraft, and a processor 450 and memory 452 coupled thereto. The processor 450 is configured to store video content from the satellite video receiver 460 in the memory 452 based upon a popularity rating of the video content, and supply stored video content to the PEDs 440 via the WLAN. The illustrated processor 450 and memory 452 may be located within an aircraft server or aircraft server unit (ASU) 472. The ASU 472 may also be referred to as an InFlight Entertainment Server since it stores the entertainment related information for selective viewing by the passengers. The ASU 472 may store 1-3 terabytes of data, for example. This data includes playlists, movies and shows, for example, and needs to be periodically updated.

Within the aircraft 420, the ASU 472 communicates with the television streaming unit (TSU) 500. The ASU 472 can provide different data rates and display resolutions based on the different size PEDs 440, as discussed above.

The ASU 472 is advantageously updated via the satellite video receiver 460 while in flight based upon a popularity rating of the entertainment related information being recorded. The popularity rating of the video content may be based upon a number of different factors. These factors may be statistically based or user determined.

The user in user determination may be an airline personnel, for example, deciding what video content is to be recorded. The decision by the airline personnel to record may be event driven, whereby the video content is arbitrarily chosen. In terms of recording video content based on statistics, Nielson data may be used. In addition, other rating service data or even social media may be used to determine which video content is to be stored in its entirety on the ASU 472.

The popularity rating of the video content may be based upon a time of day. The popularity rating of the video content may also be based upon a broadcast channel. The live video signals received by the satellite video receiver 460 via a satellite 540 may also be recorded based upon a popularity rating of the entertainment related information being recorded. For example, current newscasts or sporting events, such as the Super Bowl™, may be recorded when first aired. In addition to updating the entertainment related information in the ASU 472 with popular movies/shows, the first 5 minutes, for example, of other movies/shows may be stored. When a requested movie/show from the playlist has only 5 minutes stored on the ASU 472, the remaining portion of the movie/show is downloaded on demand via the satellite 540. The downloaded movies/shows remain on the aircraft 420 in case other passengers select the same for viewing.

The processor 450 is configured to catalog the video content, and place the cataloged video content within an on-demand menu available for selection by a PED 440. An on-demand menu corresponds to a playlist. The presentation and offering of the entertainment related information by the ASU 472 may be referred to as Primetime at Flight Time. Primetime at Flight Time allows a passenger to view recently stored primetime programming which originally aired within the last 24 hours, for example.

The ASU 472 begins recording designated primetime content during its original broadcast based on a wireless configurable file. At the conclusion of (or during) the broadcast, the video content will be cataloged and placed within the playlist, which may include a Primetime at Flight Time on-demand menu, becoming immediately available for selection/viewing by passengers.

The Primetime at Flight Time on-demand menu can be divided into sub-menus representing the last 7 consecutive days of stored primetime content. An example submenu 490 for select Primetime at Flight Time on demand content is provided in FIG. 7. Once primetime content begins being recorded on a given day, the same programming from the week prior could no longer be available and will be deleted by the ASU 472.

Figure 7:
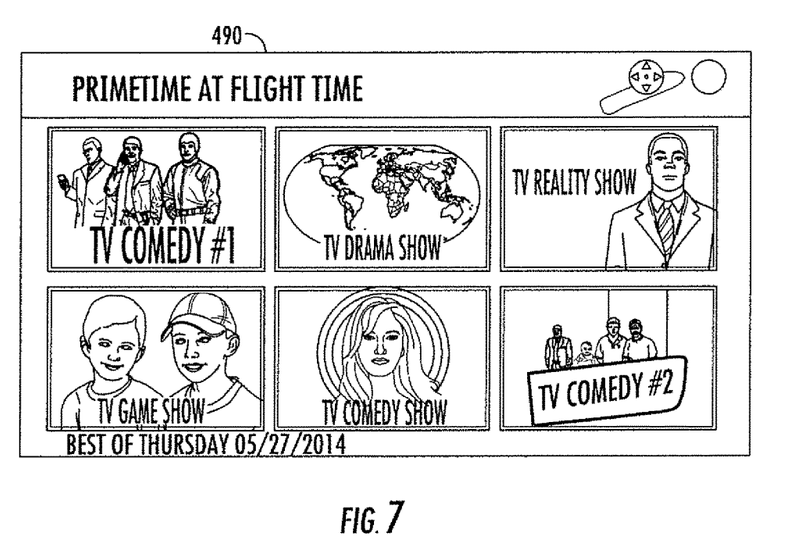
FIG. 7 is a screen shot of an on-demand menu divided into sub-menus representing consecutive days of stored prime-time content for the aircraft communications system illustrated in FIG. 6

In other words, the video content may include television shows stored over consecutive days, with each day having at least one television show associated therewith. The processor 450 is configured to divide the on-demand menu into a plurality of sub-menus, with each sub-menu representing one of the consecutive days and the television shows associated therewith. The processor 450 is further configured to remove the at least one television show from the memory 452 for each consecutive day after a predetermined number of consecutive days have occurred since being stored in the memory.

The aircraft server unit (ASU) 472 may also function as a web portal in the aircraft 420. Passengers log-in to access the ASU web portal. Once logged in, a passenger can access live television programming signals as received by the satellite 540, including television programming channel guide information. The ASU web portal thus provides live streaming for each passenger. In addition, a stored history of each logged in person may be retrieved. Based on the stored history, custom targeted advertisements may be generated in real time and injected into the live streaming for each passenger.

In addition to the ASU 472 interfacing with one or more satellites 540 over a satellite interface 542, the ASU may also interface with a cloud based server 510 over a satellite interface 552. An example cloud based server is the LiveTV connectivity management system (LCMS), which is named after the assignee of the present invention. The cloud based server 510 may interface with the different airline systems for gate and flight information, interfaces with Google to generate moving maps, as well as providing payment and processing information for on-board purchases. The cloud based server 510 also interfaces with a ground-based content management system (CMS) 520 that stores advertisements, playlists, movies and shows.

Since the ASU 472 interfaces with the cloud based server 510, updates and changes may be made on the ground and then provided to the satellite video receiver 460 via the satellite 540. The cloud based server 510 uses Nielson data, other rating service data or even social media to determine which movies/shows are to be stored in their entirety on the ASU 472.

As discussed in the background, commercial airlines typically update a portion of the stored entertainment related information each month, such as 200-300 gigabytes (GB), for example. For an airline with a large number of planes, this can be a time consuming and expensive task. It may take up to 8 hours to update 200-300 GB on an aircraft. The entertainment related information stored in the ASU 472 does not have to be uploaded at once for each aircraft 420. The data may be uploaded in sections. Sections of data may even be uploaded to an aircraft from an aircraft having already received the updates. This may be accomplished via a mesh network, for example.

Figure 8:
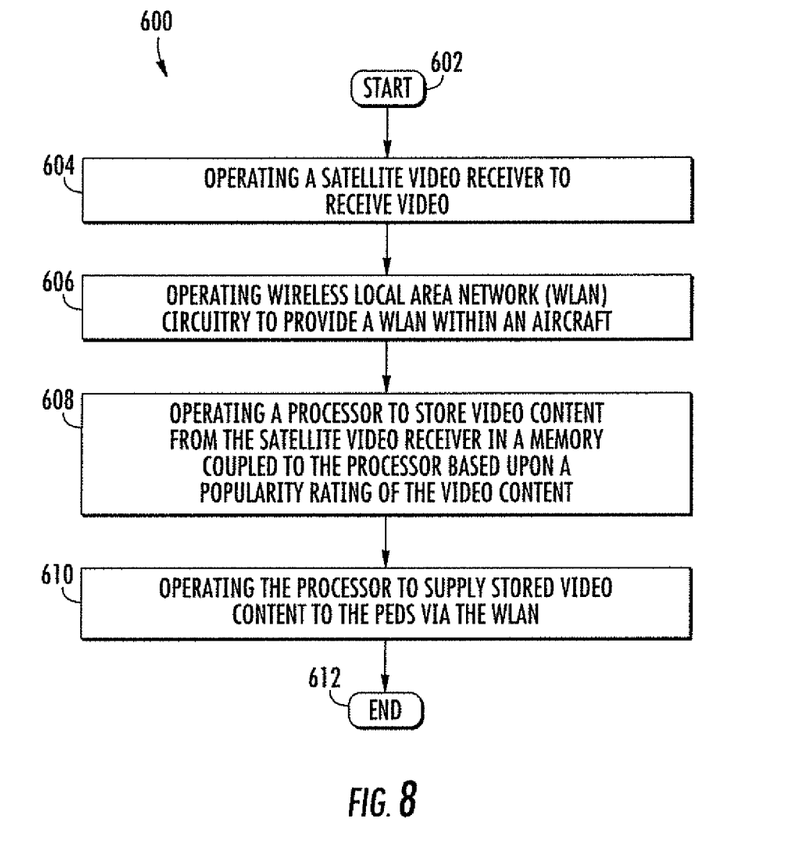
FIG. 8 is a flowchart for a method of operating the communications system illustrated in FIG. 6.

Referring now to the flowchart 600 illustrated in FIG. 8, a method for operating the communications system 400 as described above includes from the start (Block 602), operating a satellite video receiver 460 to receive video at Block 604, and operating wireless local area network (WLAN) circuitry to provide a WLAN within the aircraft 420 at Block 606. The method further includes operating the processor 450 to store video content from the satellite video receiver 460 in a memory 452 coupled to the processor based upon a popularity rating of the video content at Block 608, and supply stored video content to the PEDs 440 via the WLAN at Block 610. The method ends at Block 612.

Figure 9:
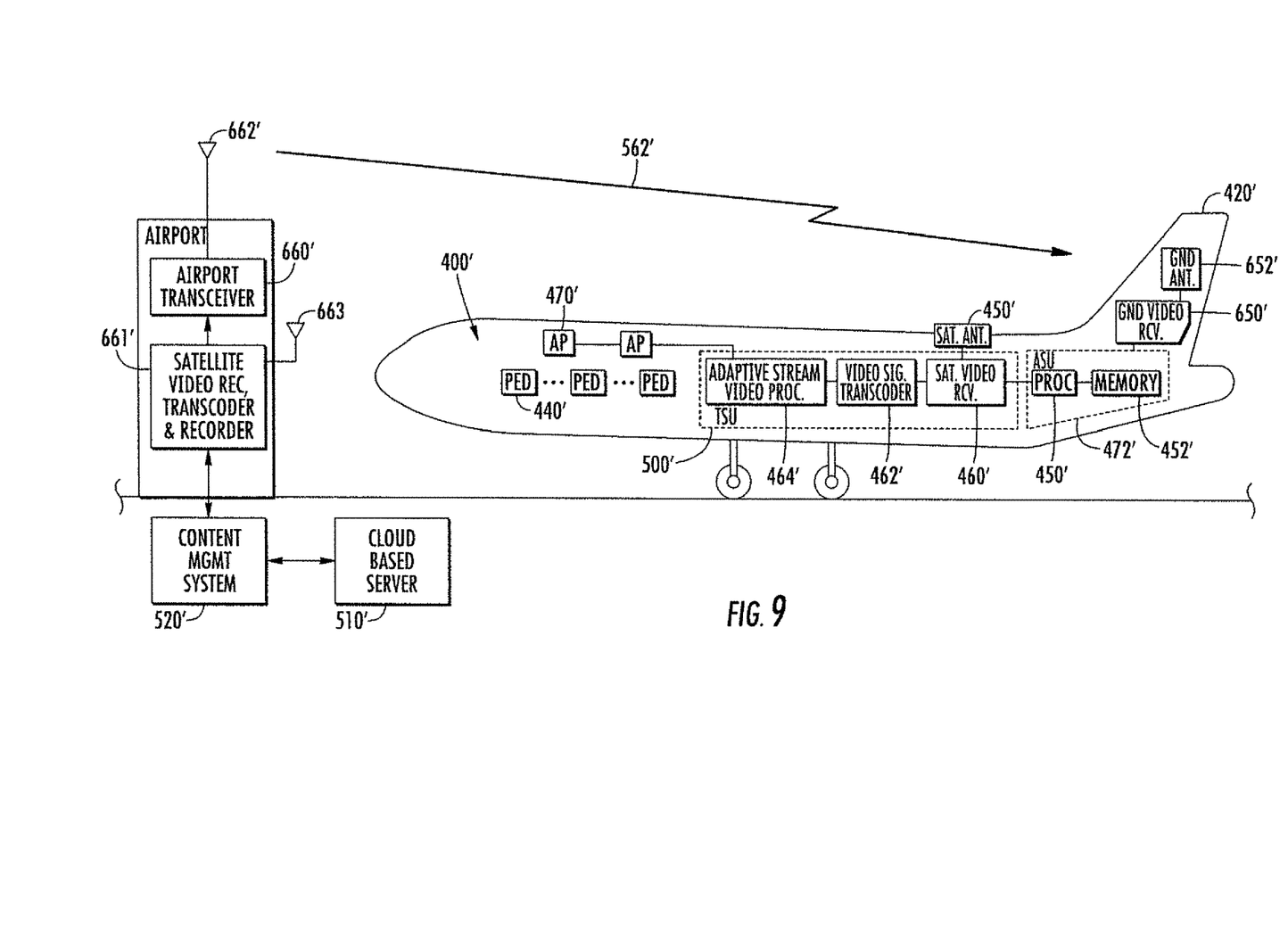
FIG. 9 is a block diagram of an aircraft communications system with a processor and a memory coupled thereto for storing video content from a ground video receiver in accordance with the present invention.

Referring now to FIG. 9, another aspect is directed to updating entertainment related information stored on an aircraft 420', with the updated entertainment related information being provided from an airport transceiver 660' on the ground to a ground video receiver 650' within the aircraft 420. Also within the aircraft 420, the ground video receiver 650' is coupled to a ground antenna 652'. Prime notation is used to indicate similar elements in alternate embodiments. As noted above, the entertainment related information includes video content, such as movies and television shows, web pages, and media other than video.

A communications system 400' for the aircraft 420' carrying PEDs 440' for wireless data communications includes a satellite video receiver 460', a ground video receiver 650', and wireless local area network (WLAN) circuitry (i.e., access points 470') configured to provide a WLAN within the aircraft, and a processor 450' and memory 452' coupled thereto. The processor 450' is configured to supply video content from the satellite video receiver 460' to the PEDs 440' via the WLAN circuitry, store video content from the ground video receiver 650' in the memory 452' based upon a popularity rating of the video content, and supply stored video content to the PEDs 440' via the WLAN.

The illustrated processor 450' and memory 452' may be located within an aircraft server or aircraft server unit (ASU) 472'. The ASU 472' may also be referred to as an InFlight Entertainment Server since it stores the entertainment related information for selective viewing by the passengers. The ASU 472' may store 1-3 terabytes of data, for example. This data includes playlists, movies and shows, for example, and needs to be periodically updated.

Within the aircraft 420', the ASU 472' communicates with the television streaming unit (TSU) 500'. The ASU 472' can provide different data rates and display resolutions based on the different size PEDs 440', as discussed above. In other embodiments, there is no TSU 500' and the ASU 472' connects directly to the access points 470'.

The ASU 472' is advantageously updated via the ground video receiver 650' while on the ground based upon a popularity rating of the entertainment related information being recorded. The popularity rating of the video content may be based upon a time of day. The popularity rating of the video content may also be based upon a broadcast channel. Popular movies/shows as determined by Nielson data, for example, may be stored in their entirety on the ASU 472'. In addition, other rating service data or even social media may be used to determine which movies/shows are to be stored in their entirety on the ASU 472'.

Since recording the entertainment related information may be performed in real time (i.e., during original broadcast) on the ground and then later forwarded to the ASU 472' when the aircraft 420' is at the terminal, this is referred to store and forward. The recording may be performed, for example, by a ground-based satellite video receiver, transcoder and recorder assembly 661'. The assembly 661' is coupled to an antenna 663'. Transcoding of the recorded entertainment related information may also be performed by the assembly 661' instead of on the aircraft 420'.

The ground video receiver 650' may also be configured to receive live video signals which may be recorded based upon a popularity rating of the entertainment related information being recorded. For example, current newscasts or sporting events, such as the Super Bowl™, may be recorded when first aired. The ground video receiver 650' may be a WLAN from the aircraft 120' to an access point at the airport, for example. A cellular communications link may also be used on the ground.

In addition to updating the entertainment related information in the ASU 472' with popular movies/shows, the first 5 minutes, for example, of other movies/shows may be stored. When a requested movie/show from the playlist has only 5 minutes stored on the ASU 472', the remaining portion of the movie/show is downloaded on demand via the satellite 540'. The downloaded movies/shows remain on the aircraft 420' in case other passengers select the same for viewing.

The processor 450' is configured to catalog the video content, and place the cataloged video content within an on-demand menu available for selection by a PED 440'. An on-demand menu corresponds to a playlist. The presentation and offering of the entertainment related information by the ASU 472' may be referred to as Primetime at Flight Time. Primetime at Flight Time allows a passenger to view recently stored primetime programming which originally aired within the last 24 hours, for example.

The ASU 472' begins storing designated primetime content based on a configurable file. At the conclusion of or during the storing, the video content will be cataloged and placed within the playlist, which may include a Primetime at Flight Time on-demand menu, becoming immediately available for selection/viewing by passengers.

The Primetime at Flight Time on-demand menu can be divided into sub-menus representing the last 7 consecutive days of stored primetime content. Once primetime content begins being recorded on a given day, the same programming from the week prior could no longer be available and will be deleted by the ASU 472'.

In other words, the video content may include television shows stored over consecutive days, with each day having at least one television show associated therewith. The processor 450' is configured to divide the on-demand menu into a plurality of sub-menus, with each sub-menu representing one of the consecutive days and the television shows associated therewith. The processor 450' is further configured to remove the at least one television show from the memory 452' for each consecutive day after a predetermined number of consecutive days have occurred since being stored in the memory.

The aircraft server unit (ASU) 472' may also function as a web portal in the aircraft 420'. Passengers log-in to access the ASU web portal. Once logged in, a passenger can access live television programming signals as received by the satellite 540', including television programming channel guide information. The ASU web portal thus provides live streaming for each passenger. In addition, a stored history of each logged in person may be retrieved. Based on the stored history, custom targeted advertisements may be generated in real time and injected into the live streaming for each passenger.

In addition to the ASU 472' interfacing with one or more satellites 540', the ASU may also interface with a cloud based server 510'. An example cloud based server is the LiveTV connectivity management system (LCMS), which is named after the assignee of the present invention. The cloud based server 510' may interface with the different airline systems for gate and flight information, interfaces with Google to generate moving maps, as well as providing payment and processing information for on-board purchases. The cloud based server 510' also interfaces with a ground-based content management system (CMS) 520' that stores advertisements, playlists, movies and shows.

The CMS 520' further interfaces with a transceiver 660' that is coupled to an antenna 662'. Updates and changes to the ASU 472' may be provided from the CMS 520' to the ground video receiver 650' over a ground interface 562' via the transceiver 660' at the airport. The cloud based server 510' uses Nielson data, other rating service data or even social media to determine which movies/shows are to be stored in their entirety on the ASU 472'.

As discussed in the background, commercial airlines typically update a portion of the stored entertainment related information each month, such as 200-300 gigabytes (GB), for example. For an airline with a large number of planes, this can be a time consuming and expensive task. It may take up to 8 hours to update 200-300 GB on an aircraft. The entertainment related information stored in the ASU 472' does not have to be uploaded at once for each aircraft 420'. The data may be uploaded in sections. For example, a section of data may be uploaded when the aircraft 420' is at the airport. Sections of data may even be uploaded to an aircraft from an aircraft having already received the updates. This may be accomplished via a mesh network, for example.

Figure 10:
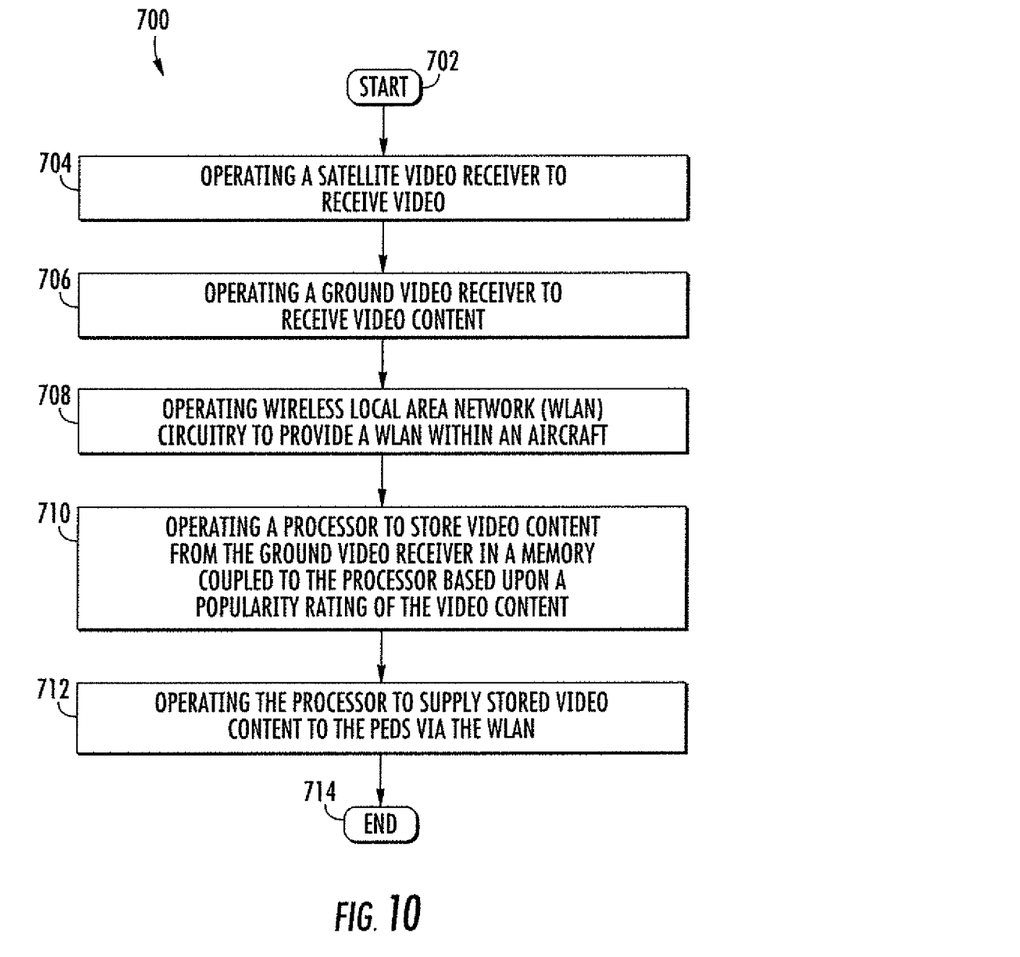
FIG. 10 is a flowchart for a method of operating the communications system illustrated in FIG. 9.

Referring now to the flowchart 700 illustrated in FIG. 10, a method for operating the communications system 400' as described above includes from the start (Block 702), operating a satellite video receiver 460' to receive video at Block 704, operating a ground video receiver 650' to receive video content at Block 706, and operating wireless local area network (WLAN) circuitry to provide a WLAN within the aircraft 420' at Block 708. The method further includes operating the processor 450' to store video content from the ground video receiver 650' in a memory 452' coupled to the processor based upon a popularity rating of the video content at Block 710, and supply stored video content to the PEDs 440' via the WLAN at Block 712. The method ends at Block 714.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system for an aircraft, the communications system comprising:
a processor and memory coupled thereto,
said processor configured to:
select video content based on popularity rating of the video content;
cause a video content receiver to receive a first portion of the selected video content through a wireless communication link to at least one ground-based content server while the aircraft is on the ground and store the first portion of the selected video content in the memory,
in response to receiving a request from a personal electronic device (PED), selectively supply the first portion of the selected video content from the memory to the PED through a cabin wireless communication link while the aircraft is in flight,
in response to supplying the first portion of the selected video content to the PED, cause the video content receiver to receive video signals comprising a second portion of the selected video content through a wireless communication link to the at least one ground-based content server while the aircraft is in flight and store the second portion of the selected video content in the memory, and
selectively supply the second portion of the selected video content from the memory to the PED through the cabin wireless communication link while the aircraft is in flight.

2. The communications system according to claim 1 wherein the popularity rating of the video content is based on statistics.

3. The communications system according to claim 1 wherein the popularity rating of the video content is user determined.

4. The communications system according to claim 1 wherein the popularity rating of the video content is based upon a time of day.

5. The communications system according to claim 1 wherein the popularity rating of the video content is based upon a broadcast channel.

6. The communications system according to claim 1 wherein said processor is configured to catalog the video content, and place the cataloged video content within an on-demand menu available for selection by a PED.

7. The communications system according to claim 6 wherein the video content comprises a plurality of television shows stored over a plurality of consecutive days, with each day having at least one television show associated therewith; and wherein said processor is configured to divide the on-demand menu into a plurality of sub-menus, with each sub-menu representing one of the consecutive days and the television shows associated therewith.

8. The communications system according to claim 7 wherein said processor is configured to remove the at least one television show from said memory for each consecutive day after a predetermined number of consecutive days have occurred since being stored in said memory.

9. The communications system according to claim 1 wherein said satellite video receiver is configured to receive live video signals.

10. The communications system according to claim 1 wherein the stored video content is supplied to the PEDs as streaming video.

11. The communications system according to claim 1, wherein the first portion of the selected video content is a first sequential portion of the selected video content and the second portion of the selected video content is a second sequential portion of the selected video content immediately following the first sequential portion.

12. The communications system according to claim 11 wherein the WLAN comprises at least one of an 802.11 WLAN and an 802.16 WLAN.

13. The communications system according to claim 1, said wherein the video content receiver comprises
a satellite video receiver, the processor further configured to cause the satellite video receiver to receive live video signals comprising the selected video content while the aircraft is in flight.

14. A method for operating a communications system for an aircraft, the method comprising:
selecting, via a processor, video content based on popularity rating of the video content;
causing, via the processor, a video content receiver to receive a first portion of the selected video content through a wireless communication link to at least one ground-based content server while the aircraft is on the ground and store the portion of the selected video content in a memory,
in response to receiving a request from a personal electronic device (PED), selectively supplying the first portion of the selected video content from the memory to the PED through a cabin wireless communication link while the aircraft is in flight, and
in response to supplying the first portion of the selected video content to the PED, receiving video signals comprising a second portion of the selected video content through a wireless communication link to the at least one ground-based content server while the aircraft is in flight and store the second portion of the selected video content in the memory.

15. The method according to claim 14 wherein the popularity rating of the video content is based on statistics.

16. The method according to claim 14 wherein the popularity rating of the video content is user determined.

17. The method according to claim 14 wherein the popularity rating of the video content is based upon a time of day.

18. The method according to claim 14 wherein the popularity rating of the video content is based upon a broadcast channel.

19. The method according to claim 14 further comprising cataloging, via the processor, the video content, and
placing, via the processor, the cataloged video content within an on-demand menu available for selection by the PED.

20. The method according to claim 19 wherein the video content comprises a plurality of television shows stored over a plurality of consecutive days, with each day having at least one television show associated therewith; and further comprising operating the processor to divide the on-demand menu into a plurality of sub-menus, with each sub-menu representing one of the consecutive days and the television shows associated therewith.

21. The method according to claim 20 further comprising removing, via the processor, the at least one television show from the memory for each consecutive day after a predetermined number of consecutive days have occurred since being stored in the memory.

22. The communications system according to claim 1, wherein the processor is further configured to:
- receive the request from a personal electronic device (PED) via a wireless local area network (WLAN); and
- selectively supply the first portion and the second portion of the selected video content to the PED via the WLAN while the aircraft is in flight.

23. The communications system according to claim 11 wherein said WLAN is provided via WLAN circuitry comprising at least one access point.

24. The communications system according to claim 11, wherein the first sequential portion of the selected video content has a duration of 5 minutes.

* * * * *